United States Patent [19]

Wright et al.

[11] 4,058,067

[45] Nov. 15, 1977

[54] TREATMENT OF SEEDLINGS

[75] Inventors: John F. Wright, North Tonawanda; Terrance M. Cannan, Depew, both of N.Y.

[73] Assignee: FMC Corporation, Philadelphia, Pa.

[21] Appl. No.: 739,399

[22] Filed: Nov. 8, 1976

Related U.S. Application Data

[63] Continuation of Ser. No. 580,571, May 27, 1975, abandoned.

[51] Int. Cl.$^2$ .................. A01G 1/00; A01C 1/00; A01N 17/00
[52] U.S. Cl. .................. 111/1; 47/DIG. 11
[58] Field of Search .................. 47/DIG. 9, DIG. 11, 47/56, 58; 111/1

[56] References Cited

U.S. PATENT DOCUMENTS

| 2,057,413 | 10/1936 | Bridgeman et al. | 117/3 |
|---|---|---|---|
| 2,553,577 | 5/1951 | Hale et al. | 47/57.6 |
| 2,720,726 | 10/1955 | Ferguson | 47/58 |
| 2,923,095 | 2/1960 | Magimel-Pelonnier | 47/58 |
| 3,834,073 | 9/1974 | Dorschner et al. | 47/57.6 |
| 3,847,641 | 11/1974 | Cushman et al. | 47/58 X |

Primary Examiner—Robert E. Bagwill
Attorney, Agent, or Firm—Robert L. Andersen; H. R. Ertelt

[57] ABSTRACT

A procedure for the treatment of roots of seedlings whereby the roots are provided a water-rich coating, having a surface sufficiently dry and moisture-stable to permit the seedlings to remain discrete and to preserve the integrity of the coating during ordinary handling and planting operation, but sufficiently moisture-sensitive so that soon after planting, the coating disintegrates and releases the pesticide, thus providing the plant protection against pests over an extended period of time. The method is applicable with insecticides, nematicides and fungicides, whether these pesticides are systemic or non-systemic.

2 Claims, No Drawings

TREATMENT OF SEEDLINGS

This is a continuation, of application Ser. No. 580,571, filed May 27. 1975 (now abandoned).

BACKGROUND OF THE INVENTION

The application of materials to the roots of seedlings prior to transplanting is a known practice. The usual procedure consists simply of dipping the roots of seedlings into a solution of toxicant immediately prior to insertion of the seedling into the proposed growth medium.

This practice is unsatisfactory in many cases, particularly in the case of paddy rice, because the water of the paddy tends to wash off the toxicant before the roots of the seedling can be placed in the soil beneath the water. In many cases, phytotoxicity of the desired compound precludes the intimate contact of the root with the pesticide as would be incurred in the normal manner of dipping roots into solutions of toxicant.

Current pesticide usage by application of the pesticide by spraying from knapsack or boom sprayers, by aerial applications from helicopters, etc., present a number of difficulties. Because the pesticide cannot by these methods of application be placed specifically into the precise areas where protection is essential, the entire field must be treated, and a greater than essential amount of pesticide must be introduced into the environment. This is undesirable both from the standpoint of economics, or purchase of pesticides, and from the standpoint of exposure of the environment to the undue amount of chemical. Because the spraying or dusting is subject to the vagaries of wind, there is also the ever present danger of drift of the applied pesticide into areas where treatment is not needed and may even be quite undisirable. The problems of placement of the pesticide have been particularly important where the site of attack by the undesired organisms is beneath the surface of the soil in the root zone, as, for example, in rice and other transplanted crops.

Attempts to overcome these problems have involved formulating the pesticides into granular particles sufficiently heavy as to be susceptible to wind drift. Seed treatment techniques have been tried with varying sucess. Root-soak and root-coat treatments have been more effective and have led to a variety of attempts to place the pesticides into the root zone using "capsules" made from small sections of paper straw, or "gelatin" capsule, such as are commonly used in pharmaceutical packaging. These provided excellent control but their preparation is extremely tedious and expensive and their individual insertion into the root zone of each individual plant was equally tedious and time-consuming.

A technique for the placing of a pesticide in the root-zone of a pine seedling by previous coating of the root is described by Walstad, Journal of Economic Entomology, Vol. 66, No. 5, pp. 1219–20, October 1973. This technique was experimentally found totally unsatisfactory for use in the case of flexible plants such as rice because the seedling are so flexible that their root systems cannot be dipped into the thick clay slurries. Further, the clay coating rewets so rapidly as to disintegrate before the rice seedling reaches the soil of the paddy in which it is to be planted. And finally, the clay coating in drying desiccates the rice seedling roots to such extent that the seedling cannot survive the treatment.

Pesticides particularly useful for application via root treatment as described herein are those having a good contact insecticidal activity as well as a good systemic insecticidal activity. Outstandingly useful is carbofuran, described in U.S. Pat. No. 3,474,171, issued 1 Oct. 1969 to William G. Scharpf and assigned to FMC Corporation which patent may be considered to be fully incorporated herein.

THE INVENTION

The invention accordingly is embodied in a process for treatment of the root systems of seedlings, wherein an aqueous solution of a thickener, such as gelatin, carrying in suspension a formulation of a pesticide, such as carbofuran, is applied to the roots of the seedlings, thus providing a dual benefit of maintaining the roots, particularly the fine feeder hairs, in a moist condition during shipment and storage and providing a pesticide adjacent to the root for non-systemic and systemic protection of the plant against attack.

Water soluble gelatin is particularly suitable, and the solution prepared should be as thin as can be, consistent with developing a gelatin film capable of taking up enough pesticide to maintain a useful amount of the pesticide at the root zone of the plant during a reasonable period of time. Generally, a solution of about one to ten percent of gelatin, by weight, is useful and recommended. Beyond assurance of its consistently reproducible solutions, the purity of the gelatin is not important. The gelatin decomposes in the soil to become plant fertilizer. The amount of insecticide is also small, of about the same order of magnitude, i.e., one to ten percent by weight in the gelatin suspension. Also suitable as thickeners are natural gums such as gum arabic or gum tragacanth or synthetic compounds such as polyvinyl alcohol of 100 – 1000 molecular weight. The thickener should have enough water solubility to provide the solution which will form a water-rich resinous film on the roots.

It is obvious that in an intensive agricultural situation, any increase in yield is a step forward. However, in an intensively cultivated area, the eco system becomes altered leading to the development of unexpected variations in the pest fauna. For example, a dense stand of rice creates a microenvironment beneath the plant canopy which is ideally suited to the reproduction of brown planthoppers; but there are many varieties of rice and there are many species of insects attacking rice. For example, there are about sixteen insects of major significance as rice pests. These include stem borers, leafhoppers, cutworms, armyworms, whorl maggots, plant hoppers, rice worms and locusts, each characterized by their own habits and habitat. Thus, there is no single approach to insect control which will be adequate; however, contact activity by a pesticide in the root zone and systemic insecticidal activity in the other parts of the plant offer a very potent combination. It is thus readily seen that formulations such as those described herein based on gelatin, polyvinyl alcohol, etc., would be particularly useful in rice paddies because the treated plant can be conveyed to the underwater soil without significant loss of pesticide into the paddy water.

The application of insecticides to rice paddy water, although more effective than the foliar spray, requires more material in terms of total pesticide applied. Attempts were made to reduce the number of applications and the amount of active material applied without sacrificing its insect control efficiency. One such method was to soak the seedlings in insecticide solution for a certain period of time prior to transplanting. For example, soaking seedlings in a suspension containing 1200 ppm. carbofuran led to high mortality among the green leafhoppers but had little effect on the brown planthoppers. The root-soak treatment provided protection to transplanted rice only during very early stages of growth and supplementary treatments were necessary to maintain the crop during periods of high insect infestation. Necessity for these supplementary treatments led to developement of root-zone placement techniques. For example, insecticide formulations in lengths of perforated paper straws or gelatin capsules were inserted to a point 2.5 cm. below the soil surface and 2.5 cm. away from the plant at a time 3 to 5 days after transplanting using an application rate equivalent to 2 kg. active ingredient per hectare. In greenhouse studies using this technique, many insecticides were effective against green leafhoppers up to 10 days after transplanting; however, only a very few such as carbofuran, metacrate and acephate were effective against brown planthoppers at 10 days after transplanting. Thus it is seen that the root-zone application approach is very effective. However, the packaging of insecticides into the required small containers is tedious and time-consuming thus expensive.

As a constructive alternative we have developed a root treatment wherein the root system is dipped into an aqueous solution of a hydrophilic material such as gelatin, polyvinyl alcohol, gum tragacanth and the like, containing suspended therein a wettable powder, emulsifiable concentrate or similar formulation of a pesticide, then allowing the accrued layer to dry so as to form a skin or protective gel around the root system. In the case of carbofuran, this layer carries enough insecticide so that a typical dip of a single rice seedling will provide about 10 to 15 milligrams of carbofuran, sufficient to provide protection to the rice plant throughout its life. We have related this amount of insecticide to carbofuran, but it should be understood, of course, that normal amounts will vary with the particular insecticide concerned. Thus, different insecticides might require retention of a smaller amount, in which case the formulation of the gelatin solution would be adjusted to provide a larger or smaller amount. This is all related to the amount of solution which is picked up in the typical root dip operation.

The procedure is to dip the seedlings into the solution of hydrophilic material containing the pesticide and have a certain amount of formulation remain with the roots. While the coating dries in place, it will not desiccate the roots in the normal sense of desiccation. On the contrary, the gelatin actually will retain water adjacent to the root hairs and keep them from drying out. In addition the insecticide sticks close to the roots and is available to the plant over a prolonged period. It is at the actual time of planting that the gelatin coating effects its greatest influence. For example, in the planting of rice seedlings, a wet root dip is virtually of no use at all, because when the seedling is passed through the few inches of water normally standing in a rice paddy, the composition is washed away from the roots. In our method, the delay in disintegration of the coating permits passing the seedling through the water layer and into the soil while keeping all of the insecticide adjacent to the roots where it is available to serve as a reservoir during growth. It should be understood that the roots of the rice plants cannot withstand desiccation; the insecticide must adhere efficiently so that when the seedling is passed through the water and planted in the soil of the rice paddy, the insecticide coating will not wash away from the root.

The following procedure can be used as a guide for the preparation of the composition for root dipping:

EXAMPLE 1

Five grams of gelatin was added to 40 grams of water and the mixture was warmed until all gelatin had dissolved. Thirty grams of carbofuran flowable formulation (described below) was blended with 35 grams of water. The carbofuran suspension was added to the gelatin solution and the mixture was stirred vigorously until uniform. The roots of 3 - 4 week old rice seedlings (Oryza sativa L. var. Nova 66) (the extended leaf is 6 - 7 inches long at this stage) were dipped into the aqueous gel and laid aside. The coating picked up by the root system averaged about 100–125 milligrams per plant, a quantity sufficient to provide the 10–15 milligrams of carbofuran necessary to protect the plant throughout its life. The mixture described was sufficient to treat 800–1000 rice seedlings.

The carbofuran flowable formulation employed was a standard commercial formulation composed as follows:

| | |
|---|---|
| carbofuran | 42.8 per cent |
| kaolin clay | 13.0 per cent |
| surfactant | 4.0 per cent |
| water | 40.2 per cent |

EXAMPLE 2

Nineteen grams of gelatin was dissolved in 500 grams of hot water. A mixture of 120 grams of carbofuran flowable formulation (as described in Example 1) and 343 grams of water was blended, then added to the gelatin solution. The mixture was blended thoroughly to give a uniform suspension. The roots of 1–2 year-old loblolly pine (Pinus taeda L.) seedlings were dipped in the mixture to obtain a uniform coating and the seedling laid aside to dry. The quantity described is sufficient to treat 500–800 plants. On average a seedling picked up 1.2–2.0 grams of the gelatin mixture, which quantity will contain 60–100 milligrams of carbofuran, sufficient to provide protection during the first growing season after transplanting.

EXAMPLE 3

The roots of 2–3 year-old Austrian pine (Pinus nigra Arnold) seedlings were treated in the manner described in Example 2 to provide a coating of 1.5–2.0 grams, which coating contains 75–100 milligrams of carbofuran.

EXAMPLE 4

By the method of Example 1, a suspension was prepared from 10 grams of gelatin in 80 grams of water and 30 grams of carbofuran 75% wettable powder formulation in 70 grams of water. Roots of rice seedlings dipped in this suspension picked up about 1.5 grams of the mixture, equivalent to about 75 milligrams of carbofuran.

The 75% wettable powder formulation was also a standard commercial base from which the more dilute formulations are prepared and was composed as follows:

| | |
|---|---|
| Carbofuran | 75.5 per cent |
| palmetto clay | 8.5 per cent |
| attapulgite clay | 10.0 per cent |
| surfactant | 6.0 per cent |

EXAMPLE 5

Using the procedure of Example 1, a suspension was prepared by blending a mixture of 90 grams of gum tragacanth in 75 grams of water and a mixture of 60 grams of carbofuran flowable formulation in 75 grams of water. Dipping of rice seedlings into this mixture was found to provide a coating containing about 10–15 milligrams of carbofuran per seedling.

In a similar manner, seedlings of tobacco, tomatoes, strawberries, broccoli, cauliflower, cabbage, Brussels sprouts, deciduous fruit trees, spruce, fir, pine and oramental shrubs can be treated so as to provide protection to the seedlings after transplanting.

Generally, the natural gelatin and natural gums such as gum tragacanth, gum arabic and the like are preferred for forming the aqueous suspension of insecticide because they are naturally occurring compounds and decompose to form degradation products normally found in the soil. However, the various polyvinyl alcohols and similar water soluble synthetic resins are sufficiently innocuous in soil as to be useful.

In recapitulation, inspection of the examples will indicate that the active ingredient in terms of the pesticide, in the suspension used, can be in actual formulations 17.5 percent, 4.7 percent, 7,8 percent and 8.56 percent. In terms of the coating, the portion of pesticide is about 5–10 percent, or a convenient dilution of that order of magnitude. Reduced to a working formula, the object is to provide an efficient, useful amount of pesticide per seedling and we have found generally that amounts from 10 to 100 milligrams are suitable. In terms of percentage, the suitable ranges for the total suspension would be about 2 to 25 percent, preferably 4 to 20 percent; and in terms of the coating developed on seedlings, 2 to 15 percent, preferably 4 to 12 percent. Generally, formulation to provide 5 to 150 milligrams of pesticide per seedling, with a preferable range from 10 to 100 is a most useful objective. Again, the important point in the procedure of treatment is to make sure that each individual seedling has a protective coating on its roots and approximately enough pesticide to carry the seedling for a season.

For the widespread planting of things like rice, the technique and the formulation have been found very useful. Also, in reforestation projects, where many thousands of seedlings have to be handled, pine and other seedlings are very susceptible, to be benefited by this treatment.

What is claimed:

1. A method for pretreating and planting a live paddy rice seedling to provide post-planting protection of the seedling from insect attack which comprises:
   a. Applying to the root system of said seedling prior to planting an aqueous mixture of (1) 2 to 25% of a water soluble hydrophylic polymer selected from gelatin, polyvinyl alcohol, and natural gums; and (2) an insecticidally effective amount of a contact and systemic insecticide, said amount being sufficient to provide insect control for an extended period after planting;
   b. Allowing said mixture to partially dry to form over the root system a water-rich coating having a protective skin of sufficient strength to retain its integrity during handling and planting through a layer of water;
   c. Planting said seedling through a layer of water without substantially impairing the integrity of said coating.

2. The method of claim 1 wherein said insecticide is carbofuran.

* * * * *